US009221054B2

(12) United States Patent
Dilly et al.

(10) Patent No.: US 9,221,054 B2
(45) Date of Patent: Dec. 29, 2015

(54) THERMAL VALIDATION APPARATUS, ASSEMBLY INCLUDING A DEVICE FOR THE THERMAL PROCESSING OF BIOLOGICAL SAMPLES AND SUCH AN APPARATUS, AND METHOD FOR MANUFACTURING SUCH AN APPARATUS

(75) Inventors: Laurent Dilly, Vitry sur Seine (FR); Martin Benjamin Klugman, Chennevieres sur Marne (FR)

(73) Assignee: BIO-RAD INNOVATIONS, Marnes la Coquette (FR)

( * ) Notice: Subject to any disclaimer, the term of this patent is extended or adjusted under 35 U.S.C. 154(b) by 441 days.

(21) Appl. No.: 13/148,302

(22) PCT Filed: Dec. 22, 2009

(86) PCT No.: PCT/FR2009/052666

§ 371 (c)(1), (2), (4) Date: Sep. 29, 2011

(87) PCT Pub. No.: WO2010/089470

PCT Pub. Date: Aug. 12, 2010

(65) Prior Publication Data

US 2012/0039354 A1 Feb. 16, 2012

(30) Foreign Application Priority Data

Feb. 6, 2009 (FR) ..................................... 09 50751

(51) Int. Cl.
*G01K 13/00* (2006.01)
*B01L 7/00* (2006.01)
*B01L 3/00* (2006.01)

(52) U.S. Cl.
CPC ............... *B01L 7/52* (2013.01); *B01L 3/50851* (2013.01); *B01L 2200/147* (2013.01); *B01L 2300/0645* (2013.01); *B01L 2300/0663* (2013.01)

(58) Field of Classification Search
USPC ............... 374/1, 4–5, 10–12, 29, 44, 30, 124, 374/141; 702/89, 99
See application file for complete search history.

(56) References Cited

U.S. PATENT DOCUMENTS

| | | | | |
|---|---|---|---|---|
| 6,556,940 | B1 * | 4/2003 | Tretiakov et al. | 702/130 |
| 2003/0059823 | A1 | 3/2003 | Matsunaga et al. | |
| 2003/0169799 | A1 * | 9/2003 | Cho et al. | 374/31 |
| 2006/0292619 | A1 * | 12/2006 | Carrick et al. | 435/6 |
| 2008/0212643 | A1 * | 9/2008 | McGahhey et al. | 374/152 |
| 2009/0220984 | A1 * | 9/2009 | Dinges | 435/6 |

FOREIGN PATENT DOCUMENTS

| | | | |
|---|---|---|---|
| EP | 1000661 | A1 | 5/2000 |
| JP | 2002-528108 | A | 9/2002 |
| JP | 2003-174863 | A | 6/2003 |
| JP | 2007-189962 | A | 8/2007 |
| WO | WO 00/25920 | A1 | 5/2000 |
| WO | WO 01/81619 | A2 | 11/2001 |
| WO | WO 03/064990 | A2 | 8/2003 |
| WO | WO2006/105919 | * | 10/2006 |
| WO | WO 2008/136318 | A1 | 11/2008 |

* cited by examiner

*Primary Examiner* — Lisa Caputo
*Assistant Examiner* — Janice M Soto
(74) *Attorney, Agent, or Firm* — Knobbe, Martens Olson & Bear, LLP

(57) ABSTRACT

The invention relates to a thermal validation apparatus including at least one lining, each lining defining a sink and intended to be inserted into a respective recess of the thermal processing device for heating or cooling biological samples, as well as a respective temperature probe arranged in each sink. Each sleeve is made of a plastic material.

18 Claims, 5 Drawing Sheets

THERMAL VALIDATION APPARATUS, ASSEMBLY INCLUDING A DEVICE FOR THE THERMAL PROCESSING OF BIOLOGICAL SAMPLES AND SUCH AN APPARATUS, AND METHOD FOR MANUFACTURING SUCH AN APPARATUS

FIELD OF THE INVENTION

The invention relates to a thermal validation apparatus, an assembly including a device for the thermal processing of biological samples and such an apparatus, and methods for manufacturing such an apparatus.

DESCRIPTION OF THE RELATED ART

Thermal processing devices for biological samples are known in the state of the art. They are for example thermal cyclers, also called thermo cyclers or PCR (Polymerase Chain Reaction) machines, or incubators.

A thermal cycler is a device for heating biological samples automating the PCR reaction. The device is usually provided with a thermal block with heating cavities in which sinks containing the reactive mixture of the PCR is meant to be inserted. The sinks are usually delimited by a plastic support, for example a “micro plate” type support.

In order to thermally validate the thermal cycler, for example to monitor its temperature deviation, it is known to use a thermal validation apparatus of a device for the thermal processing of biological samples, of the type comprising:

- at least one sleeve, each sleeve delimiting a sink and being intended to be inserted into a respective cavity of the thermal processing device, intended to heat or cool biological samples, and
- a respective temperature probe placed in each sink.

In the state of the art, the sleeve surrounding the temperature probe is made from metal and separated from the temperature probe by air.

SUMMARY OF THE INVENTION

One aim of the invention is to provide a thermal validation device of a thermal processing apparatus for biological samples making it possible to reliably evaluate the temperature taken by the reactive mixture comprising the biological samples during the thermal processing.

To that end, one aim of the invention is a thermal validation device of the aforementioned type, characterized in that each sleeve is made from plastic.

In fact, the inventors have noted that, in the prior art device, the metal sleeve very quickly reached the temperature of the heating cavities, so that the temperature measured by the temperature probe in fact corresponds to that of the thermal block of the thermal processing device. However, the inventors have also noted that, during thermal processing of biological samples, the temperature of the reactive mixture differs substantially from the temperature of the reactive block. Owing to the invention, the temperature probe is found in conditions close to those of the reactive medium, allowing it to measure the temperature to be assumed by this reactive mixture, and not the temperature assumed by the thermal block.

According to other features of the invention:

- each sleeve is made from polypropylene,
- each sleeve is intended to withstand repeated temperature variations between 20° C. and 100° C., preferably between 20° C. and 120° C.,

- each sleeve has a thickness smaller than 0.7 mm, preferably smaller than 0.5 mm;
- the apparatus comprises a thermal material filling each sink, in which the temperature probe bathes, and the thermal material has a temperature response identical to that of water to within 5%, at least for heating speeds between 3° C. per second and 5° C. per second;
- the thermal material is a thermal fat;
- the apparatus comprises a microplate comprising a main wall, and a plurality of plastic sleeves supported by the main wall and delimiting a plurality of sinks for receiving biological samples emerging on the upper face of the main wall, a respective temperature probe being placed in at least one of the sinks, and a cover fastened on the upper face of the main wall and closing at least each sink in which a temperature probe is placed;
- the apparatus comprises an upper outer surface, separated from the main wall by a distance smaller than 8 mm, preferably smaller than 4 mm.

The invention also relates to an assembly of a thermal processing device for biological samples and a thermal validation apparatus for this thermal processing device according to the invention.

According to other features, the thermal processing apparatus is a thermal cycler;

the thermal processing apparatus is an incubator.

The invention also relates to a method of making a thermal validation apparatus of a thermal processing device intended to heat or cool biological samples contained in a microplate, characterized in that it comprises the obtainment of a microplate adapted to the thermal processing device, and comprising a main wall, and a plurality of plastic sleeves supported by the main wall and delimiting a plurality of sinks for receiving biological samples emerging on an upper face of the main wall, the fastening of at least one temperature probe on a cover, the fastening of the cover on the upper face of the main wall in order to place each temperature probe in a respective sink, and so as to close at least each of these sinks.

According to other features: the method comprises, before fastening of the cover, the filling of each sink intended to receive a temperature probe with a thermal material having a temperature response identical to that of water to within 5%, at least for heating speeds between 3° C. per second and 5° C. per second;

the thermal material is a thermal fat.

BRIEF DESCRIPTION OF THE DRAWINGS

These features and advantages of the invention, as well as others, will appear upon reading the following description of one embodiment of the invention in the context of a thermal cycler. The description refers to the appended drawings, in which.

DETAILED DESCRIPTION OF THE PREFERRED EMBODIMENT

Figure 1:
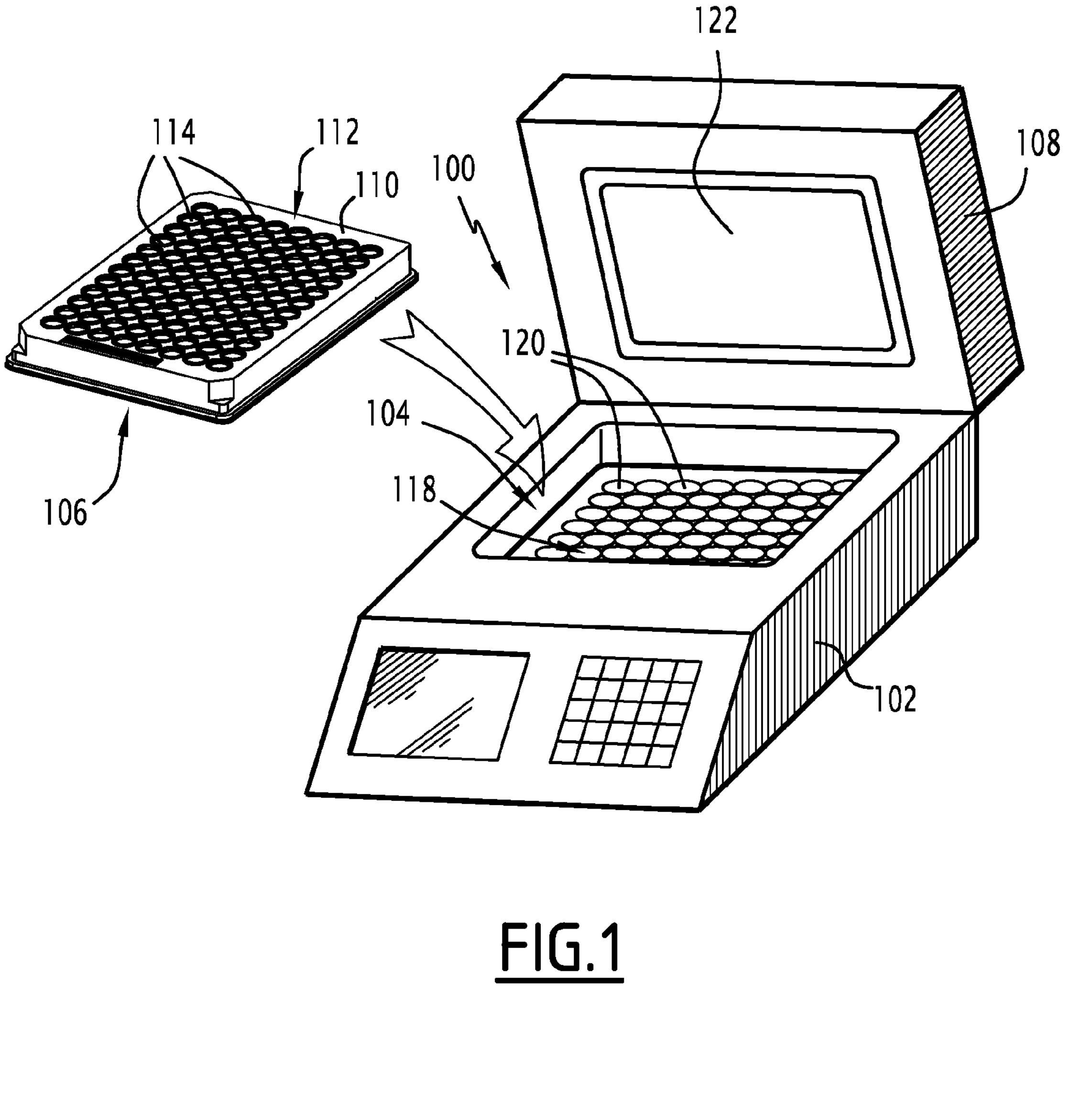
FIG. 1 is a three-dimensional view of a thermal cycler and a microplate intended to be arranged in the thermal cycler.

A thermal cycler 100 is shown in FIG. 1. The thermal cycler 100 comprises a body 102 delimiting a space 104 intended to receive a microplate 106, and a lid 108 attached to the body 102 and intended to close the space 104 receiving the microplate 106.

The microplate 106, which is for example marketed by the company Bio-Rad, forms a plastic biological sample holder. More specifically, the microplate 106 comprises a rectangular main wall 110 comprising an upper face 112. The microplate 106 also comprises sinks 114 for receiving biological samples.

Figure 2:
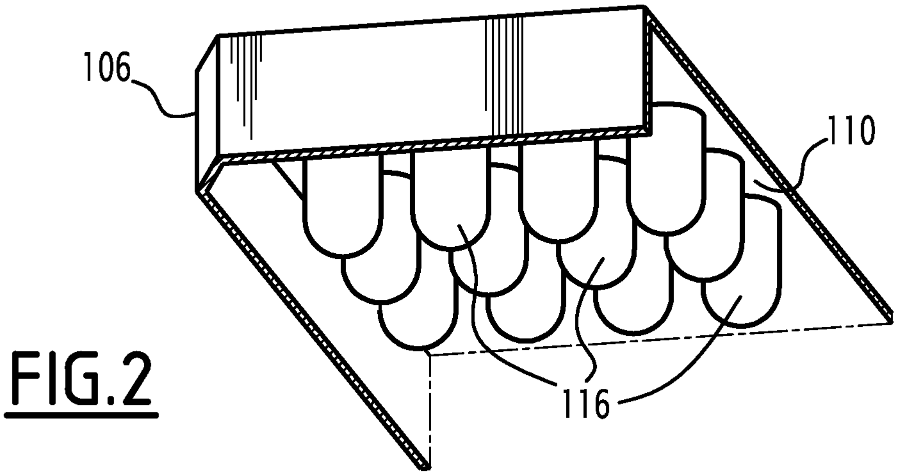
FIG. 2 is a three-dimensional bottom view of the microplate of FIG. 1.

In reference in FIG. 2, each sink 114 is delimited by a sleeve 116 supported by the main wall 110, and having a shape adapted to that of the heating cavities 120 that will be described later. Generally, the sleeve 116 is conical, or in the shape of a half-bowl or test tube. The sink 114 thus corresponds to the volume extending inside the sleeve 116.

Returning to FIG. 1, the sinks 114 emerge via the upper face 112. The sinks 114 are arranged in a matrix, generally 12 by 8 sinks, or 96 sinks.

The space 104 comprises a bottom 118 (also called thermal block), opposite the lid 108 in the closed position, in which the heating cavities 120 are formed. Each sleeve 116 is intended to be inserted in a respective heating cavity 120, so that the heating cavity 120 can heat the biological samples contained in the corresponding sink 114. The sleeves 116 have a shape fitting that of the heating cavities 120 so as to be in contact with the thermal block 118.

The lid 108 comprises a mobile plate 122, intended to bear against the upper face 112 of the microplate 106, when the latter is received in the space 104 and the lid 108 is closed.

Figure 3:
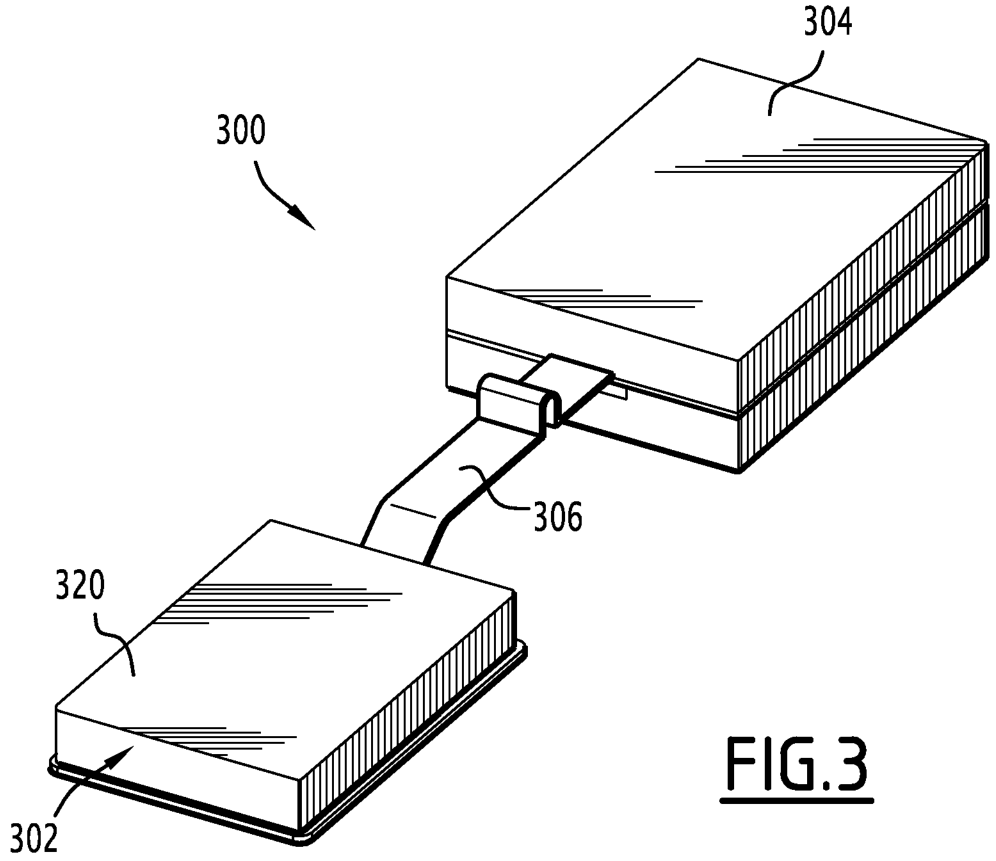
FIG. 3 is a three-dimensional view of a thermal validation system of the thermal cycler of FIG. 1.

A thermal validation system 300 of the thermal cycler 100 is shown in FIG. 3.

The validation system 300 comprises an internal thermal validation apparatus 302, intended to be introduced into the space 104 of the thermal cycler 100, and an external processing module 304, intended to remain outside the thermal cycler 100. The inner apparatus 302 and the outer module 304 are connected to each other by an information exchange layer 306, intended to pass between the lid 108 in the closed position and the body 102 of the thermal cycler 100.

Figure 4:
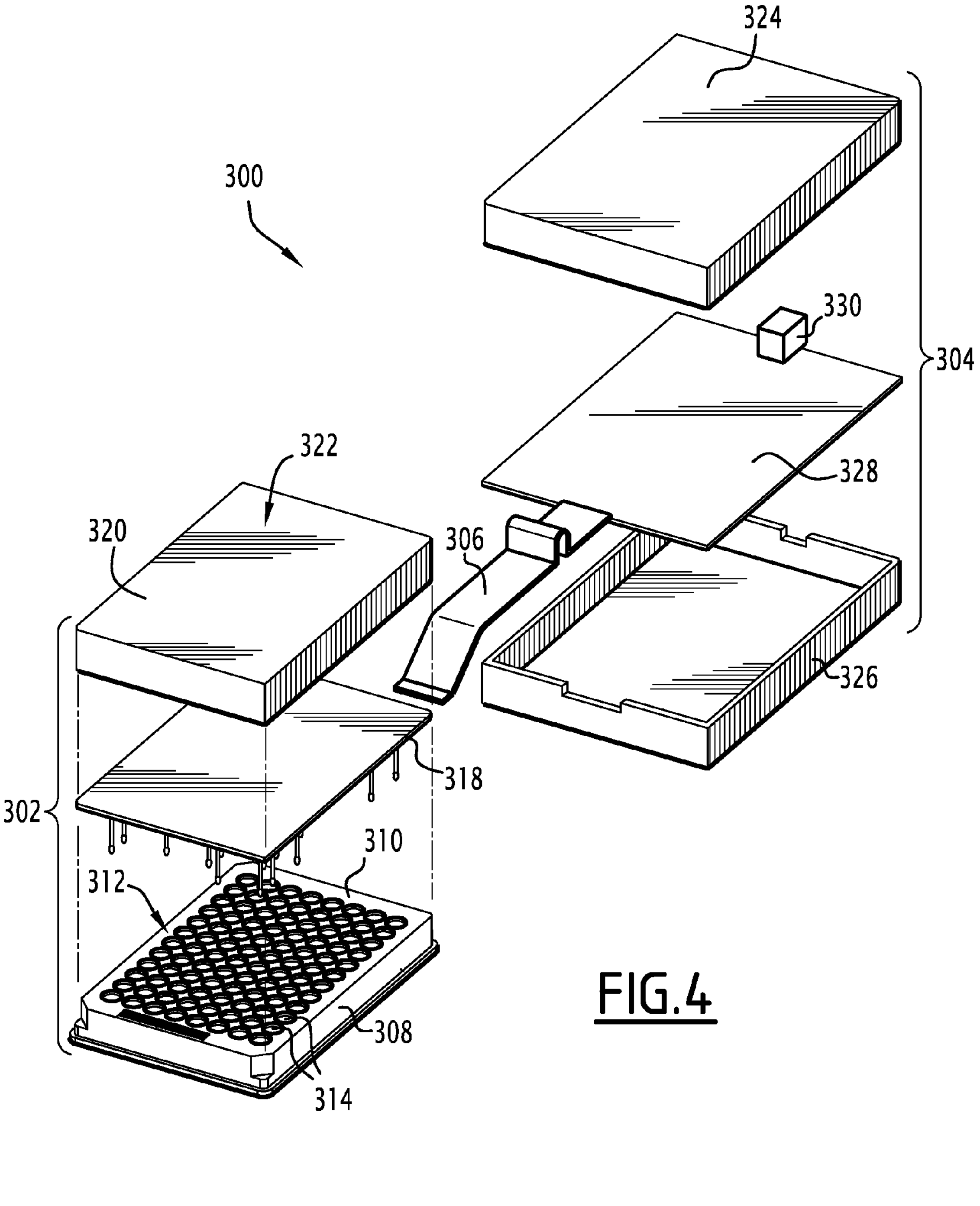
FIG. 4 is an exploded three-dimensional view of the thermal validation system of FIG. 3.

In reference to FIG. 4, the internal thermal validation apparatus 302 comprises a microplate 308, identical to the microplate 106 of FIG. 1. The microplate 308 thus comprises a main wall 310 provided with an upper face 312, and sleeves 316 (visible in FIG. 5) delimiting the sink 314 emerging on the upper face 312.

The microplate 308, and in particular the sleeves 316, are made from plastic and have a thickness of about 0.5 mm. In the described example, the plastic is polypropylene. As for the microplate 106, the microplate 308 is intended to withstand repeated temperature variations imposed by the thermal block of the thermal cycler 100 during a PCR reaction, in particular repeated temperature variations between 20° C. and 100° C., preferably between 20° C. and 120° C.

Moreover, the microplate 308 is intended to remain inert to the chemical and biological agents used for the PCR.

The internal thermal validation apparatus 302 also comprises a first printed circuit card 318 forming a cover intended to be fastened on the upper face 312 of the microplate 308, in order to close the sinks 314 thereof.

The internal thermal validation apparatus 302 also comprises a lid 320 intended to be fastened on the microplate 308 to cover both the first printed circuit card 318 and the microplate 308. The lid 320 comprises an upper outer face 322, extending above the upper face 312 of the microplate 308, on which the mobile plate 122 of the lid 108 of the thermal cycler 100 is intended to bear when the lid 108 is closed with the internal validation apparatus 302 placed in the space 104.

Preferably, when the apparatus is closed, the upper surface 312 of the microplate 308 and the upper outer face 322 of the lid 320 are separated by a distance smaller than 8 mm, preferably less than 4 mm, so that the internal thermal validation apparatus 302 does not have an excessive thickness relative to a “simple” microplate (like that of FIG. 1), which would risk preventing the lid 108 of the thermal cycler 100 from closing.

The external module 304 comprises a housing with two parts 324 and 326, as well as a second printed circuit card 328 enclosed in the housing 324, 326.

The two printed circuit cards 318, 328 are connected to each other by the layer 306. Preferably, the layer 306 extends in the continuation of the conductive layers of the printed circuit cards 318, 328, so that the layer 306 (or at least its conductive part) and these conductive layers only form one piece. This design makes it possible to avoid the use of connectors and/or welds between the layer 306 and the printed circuit cards 318, 328, which would risk introducing noise into the exchanged information.

The external module 304 also comprises a connector 330 intended to allow it to be connected to a computer, to transfer the data thereto collected by the internal thermal validation apparatus 302.

Figure 5:
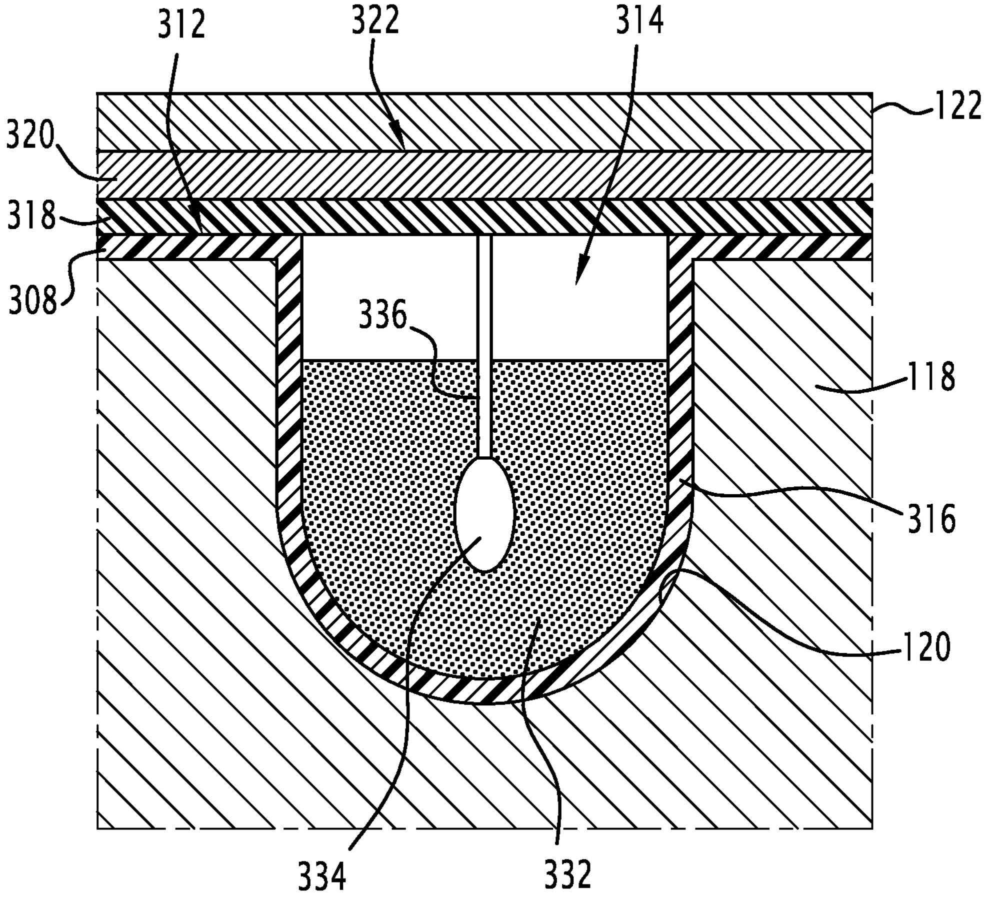
FIG. 5 is a cross-sectional view of a thermal validation apparatus of the system of FIGS. 3 and 4.

In reference to FIG. 5, the internal thermal validation apparatus 302 is placed in the space 104 of the thermal cycler 100, and the lid 108 of the latter part is closed. Each sleeve 316 is then inserted into a respective heating cavity 120 of the thermal cycler 100. It will be noted that each sleeve 316 fits the shape of the corresponding heating cavity 120 and is thus in contact with the thermal block 118.

At least part of the sinks 314 are measuring sinks, intended to gather temperature measurements. FIG. 5 is a cross-sectional view of a measuring sink 314.

Figure 6:
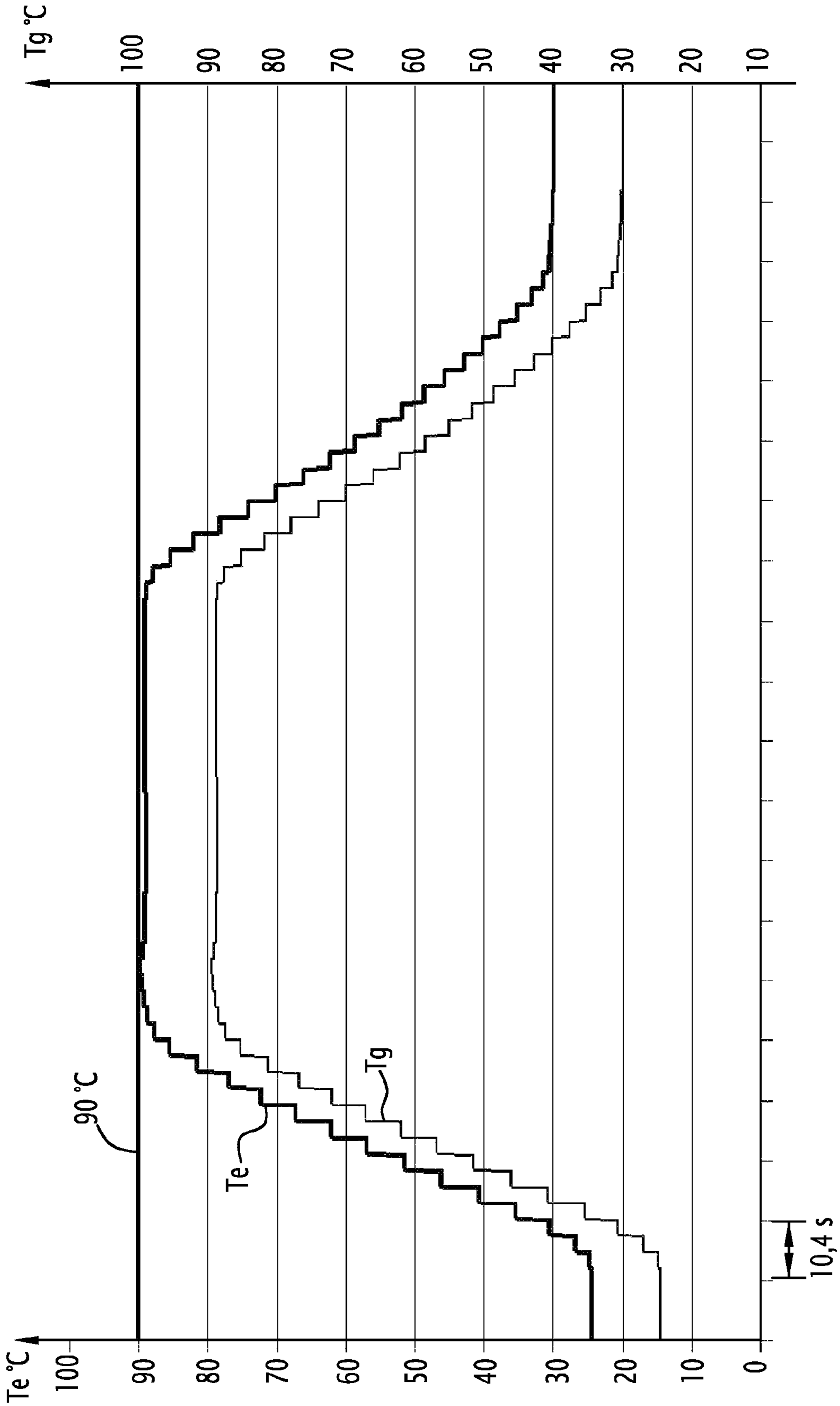
FIG. 6 is a graph showing the evolution of the temperature of the water and the temperature of a thermal fat in response to a reference temperature.

A thermal fat 332 is placed at the bottom of each measuring sink 314. The thermal fat 332 has a temperature response identical to that of water to within 5% (i.e. the thermal fat subjected to a reference temperature will have a temperature at each moment equal to within 5% of that of the water subjected to the same reference), at least for the heating speeds used in the thermal cycler 100, in particular, for heating speeds between 3° C. per second and 5° C. per second. For example, FIG. 6 shows the water temperature variation Te and the temperature variation of the thermal fat Tg during a temperature reference comprising a temperature increase of 25° C. to 90° C., maintenance at a 90° C. plateau and lowering from 90° C. to 30° C. (the curve Tg for the thermal fat is shifted 10° C. downwards so as to distinguish it from the curve Te for water). As shown in this figure, the temperature of the thermal fat Tg still remains below 5% of the water temperature Te. In particular, along the plateau at 90° C., the water temperature stabilizes at 88.7° C., while the temperature of the thermal fat stabilizes at 89° C., or less than 5% difference.

Owing to its viscosity, the thermal fat 332 remains at the bottom of the thermal sink 314 and has little chance of adhering on the first printed circuit card 318, even when the device is upside down, which can occur during transport.

A temperature probe 334 is placed in each measuring sink 314, and bathes in the thermal fat 332. More specifically, each temperature probe 334 is fastened to the first printed circuit card 318. In order to provide the measured temperature value of the first printed circuit card 318, each electric wire 336 of each probe is welded directly thereto.

The purpose of the thermal fat is to simulate the aqueous liquid present in the reactive mixture of a PCR. Thus, the probe is under conditions even closer to actual conditions.

According to the preceding, the temperature probe 334 is only separated from the thermal block by the thickness of the plastic sleeve and by a thermal fat thickness.

To manufacture the internal thermal validation apparatus 302, the following steps are carried out.

A microplate 308 is obtained, which is a microplate adapted to the heating device 100, i.e. adapted to be used in the context of a PCR with the thermal cycler 100.

At least one temperature probe 334 is fastened on a printed circuit card 318 intended to form a cover.

Each sink 314 intended to receive a temperature probe 334 is filled with thermal fat 332.

The cover 318 is fastened on the upper face 312 of the main wall so as to place each temperature probe 334 in a respective sink 314 filled with thermal fat 332, and so as to close at least each of said sinks 314.

Although the invention previously described relates to a thermal cycler, the invention is not limited to this type of device for the thermal processing of biological samples. The invention can in particular also apply to biological sample incubators.

The invention claimed is:

1. A thermal validation system comprising:

a thermal processing device comprising a body and a lid configured to have an open position and a closed position, the thermal processing device configured to heat or cool biological samples to one or more target temperatures intended to be delivered to one or more cavities of the thermal processing device;

an internal thermal validation apparatus comprising one or more sleeves, each sleeve delimiting a sink and configured to be inserted into a respective cavity of the thermal processing device configured to heat or cool biological samples, wherein each sleeve is made from plastic;

a respective temperature probe placed in each sink, each temperature probe being fastened to a first printed circuit card and configured to measure a temperature(s) in each sink;

an external processing module comprising a second printed circuit card connected to the first printed circuit card by an information exchange layer configured to pass between the lid in the closed position and the body of the thermal processing device, the information exchange layer extending as a continuation of conductive layers of the first and second printed circuit cards such that the information exchange layer and the conductive layers of the first and second printed circuit cards form a single piece; and a computer connected to the second printed circuit card by a connector, wherein the computer is configured to calibrate the thermal processing device by receiving data of the temperature(s) measured by the temperature probe(s) in each sink and comparing the data of the temperature(s) to target temperature(s) intended to be delivered by the thermal processing device to the one or more cavities of the thermal processing device.

2. The system according to claim 1, wherein each sleeve is made from polypropylene.

3. The system according to claim 1, wherein each sleeve is configured to withstand repeated temperature variations between 20° C. and 100° C.

4. The system according to claim 1, wherein each sleeve has a thickness smaller than 0.7 mm.

5. The system according to claim 1, wherein the system comprises a thermal material filling each sink, in which the temperature probe bathes, and wherein the thermal material has a temperature response identical to that of water to within 5%, at least for heating speeds between 3° C. per second and 5° C. per second.

6. The system according to claim 5, wherein the thermal material is a thermal fat.

7. The system according to claim 1 comprising:

a microplate comprising:

the main wall, and the one or more plastic sleeves supported by the main wall and delimiting the plurality of sinks configured to receive biological samples emerging on an upper face of the main wall, the respective temperature probe being placed in at least one of the sinks, and a cover fastened on the upper face of the main wall and closing at least each sink in which the respective temperature probe is placed.

8. The system according to claim 7, further comprising an upper outer surface, separated from the main wall by a distance smaller than 8 mm.

9. A method of making a thermal validation system according to claim 7 configured to heat or cool biological samples contained in a microplate comprising:

(a) obtaining the thermal processing device;

(b) obtaining the internal thermal validation apparatus; wherein the internal thermal validation apparatus comprises a microplate adapted to the thermal processing device, and comprising:

the main wall, and the one or more plastic sleeves supported by the main wall and delimiting the one or more sinks configured to receive biological samples emerging on the upper face of the main wall, (c) fastening of the at least one temperature probe on the cover, (d) fastening of the cover on the upper face of the main wall in order to place each temperature probe in the respective sink, wherein each respective sink is closed (e) obtaining the external processing module, and (f) obtaining the computer.

10. The manufacturing method according to claim 9, further comprising before step (d):

(c2) filling of each sink configured to receive a temperature probe with a thermal material having a temperature response identical to that of water to within 5%, at least for heating speeds between 3° C. per second and 5° C. per second.

11. The manufacturing method according to claim 10, wherein the thermal material is a thermal fat.

12. The system according to claim 7, further comprising an upper outer surface, separated from the main wall by a distance smaller than 4 mm.

13. The assembly according to claim 1, wherein the thermal processing device is a thermal cycler.

14. The assembly according to claim 1, wherein the thermal processing device is an incubator.

15. The system according to claim 1, wherein each sleeve is configured to withstand repeated temperature variations between 20° C. and 120° C.

16. The system according to claim 1, wherein each sleeve has a thickness smaller than 0.5 mm.

17. A thermal validation system comprising:

a thermal processing device comprising a body and a lid configured to have an open position and a closed position, the thermal processing device configured to heat or cool biological samples to one or more target temperatures intended to be delivered to one or more cavities of the thermal processing device;

an internal thermal validation apparatus comprising one or more sleeves, the one or more sleeves delimiting one or more sinks and configured to be inserted into a respective cavity of the thermal processing device, and a respective temperature probe placed in each sink, each temperature probe being fastened to a first printed circuit card, wherein each sleeve is made from plastic, an external processing module comprising a second printed circuit card connected to the first printed circuit card by an information exchange layer configured to pass between the lid in the closed position and the body of the thermal processing device, the information exchange layer extending as a continuation of conductive layers of the first and second printed circuit cards such that the information exchange layer and the conductive layers of the first and second printed circuit cards form a single piece; and a computer connected to the second printed circuit card by a connector, wherein the computer is configured to calibrate the thermal processing device by comparing a temperature(s) measured by the temperature probe(s) in each of the one or more sink(s) to temperature(s) intended to be delivered to each of the one or more sink(s) by the thermal processing device to the one or more sinks of the thermal processing device, and wherein the thermal validation system comprises a thermal material filling each sink, in which the temperature probe bathes, and wherein the thermal material has a temperature response identical to that of water to within 5%, at least for heating speeds between 3° C. per second and 5° C. per second.

18. A method of making a thermal validation system comprising:

(a) obtaining a thermal processing device comprising a body and a lid configured to have an open position and a closed position;

(b) obtaining an internal thermal validation apparatus comprising a microplate adapted to the thermal processing device, the microplate comprising:

(i) a main wall, (ii) a plurality of plastic sleeves supported by the main wall and delimiting a plurality of sinks configured to receive biological samples emerging on an upper face of the main wall, (iii) a respective temperature probe being placed in at least one of the sinks, (iv) a first printed circuit card form forming a cover, wherein the cover is fastened on the upper face of the main wall and closing at least each sink in which a temperature probe is placed;

(c) fastening of at least one temperature probe on the first printed circuit card;

(d) filling of each sink with a thermal material having a temperature response identical to that of water to within 5%, at least for heating speeds between 3° C. per second and 5° C. per second; and (e) fastening of the cover on the upper face of the main wall in order to place each temperature probe in the respective sink, wherein each respective sink is closed, (f) connecting the first printed circuit card to an external processing module comprising a second printed circuit card, wherein the first printed circuit card is connected to the second printed circuit card by an information exchange layer configured to pass between the lid in the closed position and the body of the thermal processing device, the information exchange layer extending as a continuation of conductive layers of the first and second printed circuit cards such that the information exchange layer and the conductive layers of the first and second printed circuit cards form a single piece; and (g) obtaining a computer connected to the second printed circuit card by a connector, wherein the computer is configured to calibrate the thermal processing device by comparing a temperature(s) measured by the temperature probe(s) in each sink to target temperature(s) intended to be delivered to each sink by the thermal processing device.

* * * * *